United States Patent
Rekhter et al.

(10) Patent No.: US 9,660,860 B1
(45) Date of Patent: May 23, 2017

(54) PATH COMPUTATION DELAY TIMER IN MULTI-PROTOCOL LABEL SWITCHED NETWORKS

(71) Applicant: Juniper Networks, Inc., Sunnyvale, CA (US)

(72) Inventors: Yakov Rekhter, New York, NY (US); Raveendra Torvi, Nashua, NH (US); Ravi Singh, San Jose, CA (US); Minjie Dai, San Jose, CA (US); John E. Drake, Pittsburgh, PA (US); Vishnu Pavan Kumar Beeram, Ashburn, VA (US); Yimin Shen, Shrewsbury, MA (US); Harish Sitaraman, Bangalore (IN); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 167 days.

(21) Appl. No.: 14/585,303

(22) Filed: Dec. 30, 2014

(51) Int. Cl.
   *H04L 12/26* (2006.01)
   *H04L 12/24* (2006.01)
   *H04L 12/723* (2013.01)

(52) U.S. Cl.
   CPC .......... *H04L 41/0654* (2013.01); *H04L 45/50* (2013.01)

(58) Field of Classification Search
   CPC ...................... H04L 41/0654; H04L 45/50
   See application file for complete search history.

(56) References Cited

U.S. PATENT DOCUMENTS

| | | | |
|---|---|---|---|
| 7,184,437 B1 | 2/2007 | Cole et al. | |
| 7,720,061 B1 | 5/2010 | Krishnaswamy et al. | |
| 8,077,726 B1 | 12/2011 | Kumar et al. | |
| 8,165,032 B1 | 4/2012 | Hanif et al. | |
| 8,339,959 B1 | 12/2012 | Moisand et al. | |
| 2003/0137932 A1* | 7/2003 | Nishioka | H04L 41/0668 370/216 |
| 2006/0153067 A1 | 7/2006 | Vassuer et al. | |
| 2007/0208871 A1* | 9/2007 | Vasseur | H04L 45/50 709/230 |

(Continued)

OTHER PUBLICATIONS

Berger et al., "RSVP Refresh Overhead Reduction Extensions," Network Working Group, RFC 2961, Apr. 2001, 35 pp.

(Continued)

*Primary Examiner* — Afshawn Towfighi
(74) *Attorney, Agent, or Firm* — Shumaker & Sieffert, P.A.

(57) ABSTRACT

In general, techniques are described for a path computation delay timer for multi-protocol label switched networks. As an example, an ingress network device configured to act as an ingress for a label switched path (LSP) may perform the techniques. The ingress network device comprises an interface and a processor. The interface may receive a message indicating an error along the LSP. The processor may delay an operation performed to configure a replacement LSP to be used in place of the LSP in order to provide time during which a cause of the error along the LSP is able to be determined. When the cause of the error is determined to be a failure of a network device supporting operation of the LSP, the processor may further perform the operation to configure the replacement LSP with the ingress network device such that the replacement LSP avoids the failed network device.

20 Claims, 4 Drawing Sheets

(56) References Cited

U.S. PATENT DOCUMENTS

2008/0170493 A1  7/2008  Vasseur
2008/0304494 A1  12/2008  Yokoyama
2009/0185478 A1  7/2009  Zhang
2009/0262651 A1  10/2009  Liu
2010/0106999 A1  4/2010  Hanif
2013/0336191 A1  12/2013  Zhao et al.
2014/0064062 A1  3/2014  Taillon et al.

OTHER PUBLICATIONS

Pan et al., "Fast Reroute Extensions to RSVP-TE for LSP Tunnels," Network Working Group, RFC 4090, May 2005, 39 pp.
Braden et al., "Resource ReSerVation Protocol (RSVP)—Version 1 Functional Specification," Network Working Group, RFC 2205, Sep. 1997, 112 pp.
Awduche et al., "RSVP-TE: Extensions to RSVP for LSP Tunnels," Network Working Group, RFC 3209, Dec. 2001, 61 pp.
U.S. Appl. No. 14/152,164, by Markus Jork et al., filed Jan. 10, 2014.

* cited by examiner

PATH COMPUTATION DELAY TIMER IN MULTI-PROTOCOL LABEL SWITCHED NETWORKS

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Open Shortest Path First (OSPF) or the Intermediate System to Intermediate System (IS-IS).

Multi-protocol Label Switching (MPLS) is a mechanism used to engineer traffic patterns within Internet Protocol (IP) networks. By using MPLS, an ingress device, controller or other path computation element can orchestrate the establishment of a dedicated path through a network, i.e., a Label Switched Path (LSP). An LSP defines a distinct path through the network to carry MPLS packets from an ingress device to a egress device. The ingress device for a given LSP affixes a short label associated with that LSP to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP) in which label switched routers (LSRs) disseminate labels associated with destinations, referred to generally as forwarding equivalence class (FECs). Another type of protocol is a resource reservation protocol, such as the Resource Reservation Protocol with Traffic Engineering extensions (RSVP-TE), by which dedicated resources along a specified path can be reserved. RSVP-TE uses constraint information, such as bandwidth availability, to compute paths and establish LSPs along the paths within a network. RSVP-TE may use bandwidth availability information accumulated by a link-state interior routing protocol, such as the Intermediate System-Intermediate System (ISIS) protocol or the Open Shortest Path First (OSPF) protocol.

When a failure occurs along an LSP, such as a node failure or a link failure, a router along the LSP that detects the failure typically issues an error message, such as an RSVP PathErr message, indicating to upstream routers that the LSP is unusable. The router also typically originates an OSPF/IS-IS update indicating link failure. In an attempt to avoid the failure, an ingress router for the LSP or other device computes a new path through the network and establishes a new LSP having the same ingress and egress routers but using the different path that attempts to avoid the failed component. In some instances, however, the newly reconfigured LSP may not avoid the failed component that caused the LSP to be unusable, thereby wasting path computation resources and bandwidth in terms of the RSVP-TE messages used to reestablish the LSP.

SUMMARY

In general, this disclosure describes techniques for performing path computation in multi-protocol label switched (MPLS) networks that reduces likelihood of wasted computational resources associated with path computation of a new label switched path (LSP) in response to path error messages and/or OSPF/IS-IS updates indicating link failure. The techniques may allow the head-end router (which may refer to the ingress router that admits network traffic into the LSP and as such may be referred to as an "ingress router") to avoid this potential waste by allowing for, in some instances, extra time to resolve the source of the previously detected error in the LSP.

For example, when a router along the LSP detects a failure and issues a path error message, the error message typically indicates a general error associated with the link along the LSP but does not specify whether the physical link has failed or whether a router adjacent the link has failed. As described herein, the head-end router or other device may, upon receiving this path error message, invoke a process that defers path computation for a new LSP for a configurable amount of time, which may be defined by a path computation timer, so as to resolve whether the error is due to a failure in the link or a failure of the adjacent router. Moreover, the head-end router or other device leverages additional information received from underlying interior gateway routing protocols during the deferred path computation to aid in distinguishing between failures of links and failures of nodes adjacent to links. As such, in instances of node failure, the head-end router utilizes this additional information so as to proactively avoid establishing the new LSP through a failed node. Instead, the techniques enable the head-end router to, upon detecting that the failure is due to a failed router, reestablish the LSP so as to avoid the failed router, thereby potentially avoiding waste in terms of path computation resource usage and LSP signaling bandwidth that would have occurred had the head-end router instead immediately attempted to reestablish the LSP in response to the path failure message. In other examples, in the event the head-end router affirmatively determines the failure is due to a specific link, the head-end router may continue to consider the router adjacent to the failed link for purposes for path computation for the new LSP.

In one example, a method comprises receiving, with a ingress network device that acts as an ingress for a label switched path (LSP) traversing at least a portion of a network, a message indicating an error along the LSP, and delaying an operation, with the ingress network device, performed to configure a replacement LSP to be used in place of the LSP in order to provide time during which a cause of the error along the LSP is able to be determined. The method also comprises, when the cause of the error is determined to be a failure of a network device supporting operation of the LSP, performing the operation to configure the replacement LSP with the ingress network device such that the replacement LSP avoids the failed network device.

In another example, an ingress network device may be configured to act as an ingress for a label switched path (LSP) traversing at least a portion of a network. The ingress network device comprises at least one interface configured to receive a message indicating an error along the LSP. The ingress network device also comprises one or more processors configured to delay an operation performed to configure a replacement LSP to be used in place of the LSP in order to provide time during which a cause of the error along the LSP is able to be determined. When the cause of the error is determined to be a failure of a network device supporting operation of the LSP, the one or more processors may further be configured to perform the operation to configure the replacement LSP with the ingress network device such that the replacement LSP avoids the failed network device.

In another example, a non-transitory computer-readable storage medium has stored thereon instructions that, when executed, cause one or more processors of an ingress network device to receive, with the ingress network device acting as an ingress for a label switched path (LSP) traversing at least a portion of a network, a message indicating an error along the LSP, delay an operation performed to configure a replacement LSP to be used in place of the LSP in order to provide time during which a cause of the error along the LSP is able to be determined, and when the cause of the error is determined to be a failure of a network device supporting operation of the LSP, perform the operation to configure the replacement LSP with the ingress network device such that the replacement LSP avoids the failed network device.

The details of one or more examples are set forth in the accompanying drawings and the description below. Other features, objects, and advantages will be apparent from the description and drawings, and from the claims.

DETAILED DESCRIPTION

Figure 1:
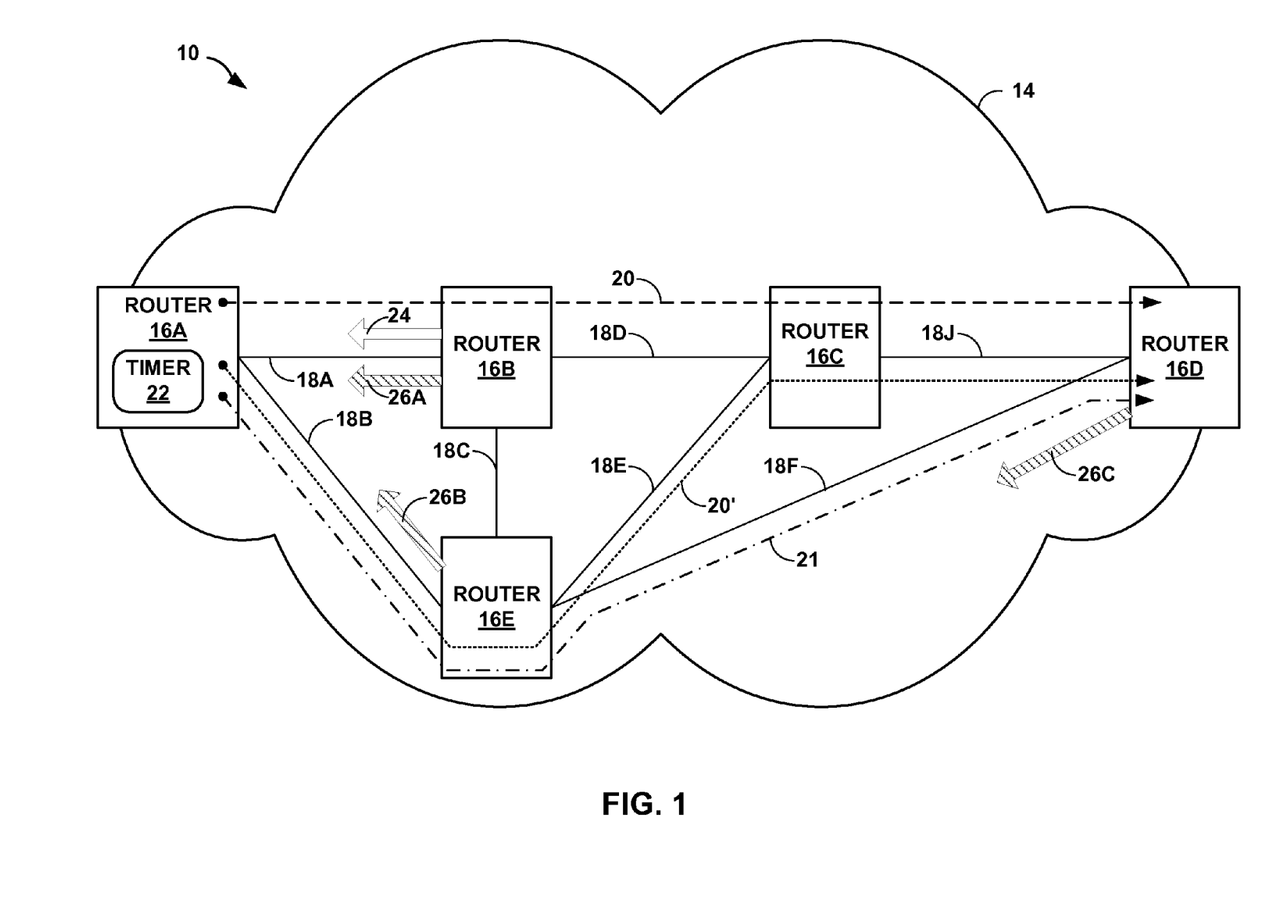
FIG. 1 is a block diagram illustrating an example system in which a router is configured to operate in accordance with various aspects the path computation delay timer techniques described in this disclosure.

FIG. 1 is a block diagram illustrating an example system 10 in which a router 16A is configured to operate in accordance with various aspects the path computation delay timer techniques described in this disclosure. Router 16A is one of a plurality of routers 16A-16E ("routers 16"). Routers 16 represent any network device that routes or otherwise forwards traffic through network 14. Although described for purposes of example with respect to router 16A, the techniques described herein may be applied by other devices, such as a path computation element (PCE), a software-defined network (SDN) controller and the like.

In the example of FIG. 1, routers 16 each represent a layer three (L3) packet-switching device that operates at L3 to exchange routing information using a routing protocol for Internet protocol (IP) networks, such as link state protocols including the open shortest path first (OSPF) routing protocol and/or the intermediate-system-intermediate-system (IS-IS) routing protocol, describing a link state of each of links 18A-18G of network 14. Routers 16 process the routing information to form a representation (e.g., in the form of a graph data structure) of network 14 and select paths based on the topology of network 14 to reach all available destinations. Routers 16 typically generate forwarding information by reducing the selected paths to so-called "next hops," which identify interfaces to which to forward traffic destined for a particular destination. In this way, the forwarding information specifies this list of next hops and associated interfaces, and maps destinations to respective interfaces. Each one of routers 16 installs the forwarding information in a forwarding plane of the router, whereupon the forwarding plane forwards received traffic in accordance with the forwarding information.

In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

Various services offered by network 14 may be enabled through the establishment of a label switched path (LSP). By using MPLS, an ingress device, such as router 16A, can request a path through a network, i.e., a Label Switched Path (LSP), such as LSP 20 in the example of FIG. 1. An LSP defines a distinct path through the network to carry MPLS packets from an ingress device, i.e., again router 16A in the example of FIG. 1, to an egress device, i.e., router 16D in the example of FIG. 1. Router 16A may admit packets to LSP 20. After admitting the packets to LSP 20, router 16A may prepend a short label associated with LSP 20 to packets that travel through network 14 via LSP 20. Routers 16B-16D along the path cooperatively perform MPLS operations to forward the MPLS packets along established LSP 20. LSPs may generally be used for a variety of traffic engineering purposes including bandwidth management and quality of service (QoS). A packet may be a formatted set of data.

Router 16A may employ one of a variety of protocols to establish LSP 20. For example, router 16A may use a label distribution protocol (LDP) to establish LSP 20. Router 16A may, in some examples, use a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the ISIS protocol or the OSPF protocol.

In the example of FIG. 1, router 16A is assumed to have used RSVP-TE to establish a traffic engineered LSP, which is shown as LSP 20. Router 16A uses RSVP-TE to establish LSP 20 that traverses router 16B and router 16C with an egress of router 16D (which may also be referred to as "egress router 16D"). Although not shown in the example of FIG. 1, additional intervening or transit routers may also be used in support of LSP 20. Likewise, contrary to the example shown in FIG. 1, LSP 20 does not necessarily require four routers 16A-16D, but may be configured using as few as two routers up to any number of routers.

Additional information regarding RSVP may be found in a request for comments (RFC) 2205, entitled "Resource ReSerVation Protocol (RSVP)—Version 1 Functional Specification," dated September 1997, the entire contents of which is hereby incorporated by reference in its entirety. More specific information regarding RSVP-TE explaining how RSVP may be extended for LSPs can be found in RFC 3209, entitled "RSVP-TE: Extensions to RSVP for LSP tunnels," dated December 2001, the entire contents of which is hereby incorporated by reference in its entirety. Given the traffic engineering nature of RSVP-TE, RSVP-TE may also provide for a way by which routers 16 may report detected failures along the LSP to the head-end router, i.e., router 16A in the context of LSP 20 shown in the example of FIG. 1.

That is, each of routers 16 may, as noted above, execute or otherwise operate in accordance with a link-state interior routing protocols, such as the OSPF routing protocol and the IS-IS routing protocol. In operating in accordance with these link-state protocols, routers 16 may continually send link state keep-alive messages (which may also be referred to as "hello messages") so as to detect failures of links. Correlation of the link failures may, as described in more detail below, allow routers 16 to, in some instances, identify failures of nodes (which may refer to routers 16 in the context of link state protocols). Although described herein with respect to link state protocols, the techniques may use bidirectional forwarding detection (BFD) or some other link-layer operations, administration, and management (OAM) protocol to detect the link failures.

In any event, these link-state protocols provide for a way by which to detect the link failures and communicate the link failures to each of routers 16 participating in the same link state protocol instance within network 14 so as to accurately reflect the topology of network 14 and enable routers 16 to converge on a single topology of network 14. These two competing mechanisms by which to report link failures may result in a race condition, where the result is dependent on which of these mechanisms is first to detect and report or otherwise communicate the failure throughout network 14.

To illustrate, when the RSVP-TE instance executed by transit router 16B first is informed of a failure of LSP 20 by the link state protocol executed by router 16B, the RSVP-TE instance executed by transit router 16B may generate and transmit a path error message 24 (which may be referred to as a "PathErr message" throughout this disclosure and in the above incorporated RFC 3209) to head-end router 16A of LSP 20. PathErr message 24 may identify link 18D as the link between transit routers 16B and 16C and indicate that his identified link has failed. Moreover, PathErr message 24 generated by router 16B may indicate that link 18D has failed even though the failure may not per se have occurred within link 18D but with downstream router 16C, thereby causing link 18D to appear in a down state to router 16B. The link state protocol executed by router 16B may also generate and send a link state advertisement (LSA) 26A indicating a failure of link 18D. The race condition occurs as a result of whether the PathErr message 24 or the LSA 26A reaches router 16A first.

In the instance where the PathErr message 24 reaches router 16A first, the RSVP-TE instance executed by router 16A may, in response to this PathErr message, immediately begin to reconfigure LSP 20 along a different path through network 14. While described as reconfiguring LSP 20, router 16A may actually configure a new LSP different than LSP 20 (at least from the perspective of the RSVP-TE instance executed by router 16A), this new LSP to be used in place of LSP 20. However, given that the same call admission control involving the same forwarding equivalence class (FEC) matching is configured for the new LSP and that the LSP is configured to forward traffic to reach the same destination, this new LSP may effectively represent a reconfigured version of LSP 20. As a result, router 16A is described in this disclosure for ease of discussion as reconfiguring LSP 20. It should be understood that discussions involving reconfiguring of LSP 20 may imply, in some examples, that router 16A tears down or otherwise removes LSP 20 from network 14 and establishes a new LSP different from LSP 20 to be used in place of LSP 20.

In any event, when the RSVP-TE instance executed by router 16A immediately begins to reconfigure LSP 20, the RSVP-TE instance of router 16A has not actually been informed of the nature of the failure. As noted above, while the PathErr message may indicate that link 18D has failed, this PathErr message does not provide any information as to whether link 18D itself has failed or whether router 16C has failed. As such, the RSVP-TE instance of router 16A may perform path selection when reconfigure LSP 20 and select a path that avoids link 18D but that traverses potentially failed router 16C. For example, the RSVP-TE instance executed by router 16A may reconfigure LSP 20 as LSP 20', where LSP 20' traverses router 16E and router 16C and egresses at router 16D. As shown, LSP 20' traverses potentially-failed router 16C, which may have been the root cause of the connectivity error previously detected by router 16B and reported as a link failure via PathErr message 24. In this respect, newly reconfigured LSP 20' may not avoid the actual error, with the result that path computation resources have been wasted along with bandwidth in terms of the RSVP-TE messages used to reestablish LSP 20'.

A similar outcome to that described above with respect to RSVP-TE may occur when LSA 26A reaches router 16A first, That is, in link state protocols, link state advertisements (LSAs) are flooded throughout network 14 such that every router 16 (or, more specifically, every router 16 participating in the link state protocol instances) within network 14 is informed of any updates to one of links 18. Each one of routers 16, upon receiving this LSA, may update its respective representation of network 14 to reflect changes in the topology of network 14. As head-end router 16A updates this representation of the topology of network 14, head-end router 16A determines whether any of the LSPs has been affected by the update. Thus, when router 16B reports the link failure via the LSA, as router 16A receives this LSA, the RSVP-TE instance executed by router 16A determines that LSP 20 has been impacted and immediately proceeds to reconfigure LSP 20. However, the RSVP-TE instance executed by router 16A may reconfigure LSP 20 as, for example, LSP 20' thereby potentially reconfiguring LSP 20' through failed router 18C. As noted above, when router 16C has failed, router 16E may subsequently detect the failure of the link 18E between itself and router 16C (via the link state protocol instance, BFD or any other type of link-layer OAM protocol or process) and report this error via a LSA. In this respect, newly reconfigured LSP 20' may not avoid the actual error, with the result that path computation resources have been wasted along with bandwidth in terms of the RSVP-TE messages used to reestablish LSP 20'.

In accordance with the techniques described in this disclosure, router 16A may perform path computation in multi-protocol label switched (MPLS) networks in a manner that reduces potential wasted computational resources involved in reestablishing LSP 20 to avoid previously detected errors. The techniques may allow head-end router 16A, or other device, to avoid this waste by allowing for, in some instances, extra time to resolve the source of the previously detected error along the path taken by LSP 20. That is, head-end router 16A may, upon receiving this path error message, wait a certain amount of time, which may be defined by a path computation timer 22, so as to resolve whether the error is due to a failure in link 18D or a failure of router adjacent to router 16B along LSP 20, which in the example of FIG. 1 is denoted as router 16C. By waiting to resolve this error, head-end router 16A may avoid reestablishing LSP 20 through failed router 16C (thereby avoiding reestablish LSP 20 as LSP 20'), which will subsequently fail. Instead, the techniques enable head-end router 16A to, upon detecting that the failure is due to failed router 16C, reestablish LSP 20 so as to avoid the failed router, thereby potentially avoiding waste in terms of path computation resource usage and LSP signaling bandwidth that would have occurred had head-end router 16C instead immediately attempted to reestablish LSP 20 as, for example, LSP 20' in response to the path failure message.

In other words, when router 16A receives one of OSPF/ISIS LSAs 26A and 26B indicating link failure, router 16A may start timer 22. Timer 22 may be associated with the link. The value of timer 22 may be referred to as the CSPF Delay Timer. At the expiration of timer 22, router 16A performs constrained shortest path first (CSPF) path computation for all the affected LSPs, such as LSP 20 in the example described above, originated by router 16A. Waiting for the CSPF Delay Timer at router 16A may allow all neighbors (i.e., routers 16B, 16E, and 16D in the example of FIG. 1) of a failed node (i.e., router 16C in the example of FIG. 1) to discover link failure between them and the failed node, to originate LSAs, such as indicating link failure between them and the failed node, and for router 16A to receive all these LSAs (e.g., LSAs 26A, 26B, and 26C). This, in turn, may allow router 16A to distinguish between a link failure and a node failure (for certain types of a node failure).

For example, router 16A may receive a message indicating an error along LSP 20. This message may comprise one of an RSVP-TE PathErr message 24 from adjacent router 16B or an LSA message 26A from adjacent router 16B. Rather than immediately begin configuring a replacement LSP to be used in place of LSP 20, router 16A may delay path selection and other operations to configure a replacement LSP to be used in place of LSP 20 in order to provide time during which to determine a cause of the error along LSP 20. As noted above, delaying configuration of the replacement LSP may allow router 16A to avoid configuring a replacement LSP similar to LSP 20'.

During the deferred path computation period, router 16A may affirmatively resolve the cause of the error through further receipt of additional LSAs, such as LSA 26B from router 16E. Router 16E may receive LSAs (not shown in the example of FIG. 1 for ease of illustration purposes) from router 16D and router 16B. In turn, router 16E may form LSA 26B to include the link states of its links 18B, 18C, 18E and 18F. Router 16E may also flood the LSA from router 16D to router 16A (and as such LSA 26B may represent any LSA sent or flooded by router 16E to router 16A). Upon receiving LSA 26B, router 16A updates the topology based on the link states of links 18D, 18E, 18F and 18J. When the links states of links 18D, 18E, 18F and 18J each indicate a connectivity error (or, in other words, fault) between routers 16B and router 16C, router 16E and router 16C and router 16D and router 16C respectively, router 16A is able to affirmatively determine that router 16C has failed rather than simply failure of link 18D. Router 16A may be configured to set timer 22 as a function of the time-outs configured within each of routers 16B-16D used to identify link failures in accordance with the operative one of the link state protocols. When the cause of the error is determined to be a failure of router 16C supporting operation of LSP 20, router 16A may at that point trigger path computation and immediately configure replacement LSP 21 that avoids failed router 16C.

In the case when router 16C has not failed but instead link 18D has failed, an LSA output by router 16C reaches router 16A via router 16E. In this way, router 16E flood the link state of link 18D to router 16A, whereupon router 16A is able to determine that link 18D has failed rather than that router 16C has failed. Responsive to this determination, router 16A cancels timer 22 (assuming timer 22 has not already expired, where this timer may also be referred to as an CSPF Delay timer 22) and perform path computation to establish a replacement LSP, which may be either of LSP 20' or 21 depending on which path provides the lowest cost (as one example).

In some instances, router 16A may be unable to determine whether router 16C or link 18D has failed. For example, network 14 may be become segmented in the event that both link 18J and 18F are inoperable. In this example, router 16E may not receive an LSA indicative of the link state of link 18J and sourced by router 16C, and therefore cannot affirmatively determine that router 16C is still operational. Router 16A may therefore not be able to definitively determine whether router 16C or link 18D has failed. In these instances, router 16A may wait for timer 22 to expire before performing path computation to configure the replacement LSP, which may be either of LSP 20' or LSP 21. In the foregoing example, however, no LSPs may be available to reach the intended egress router 16D due to the segmentation in which case establishment of the replacement LSP may not succeed. In this sense, the techniques may not always reduce waste but may potentially reduce waste in certain circumstances where immediate path computation and establishment of the LSP may potentially be avoided.

Although deferred path selection according to timer 22 may slow down convergence, router 16A may apply heuristics to ameliorate any unnecessary delay. Both of these heuristics may apply as the CSPF Delay timer is running, and are generally intended to schedule CSPF prior to the timer expiration, thus facilitating the time with which convergence may occur. Neither of these heuristics may be considered 'fool-proof'.

Figure 2:
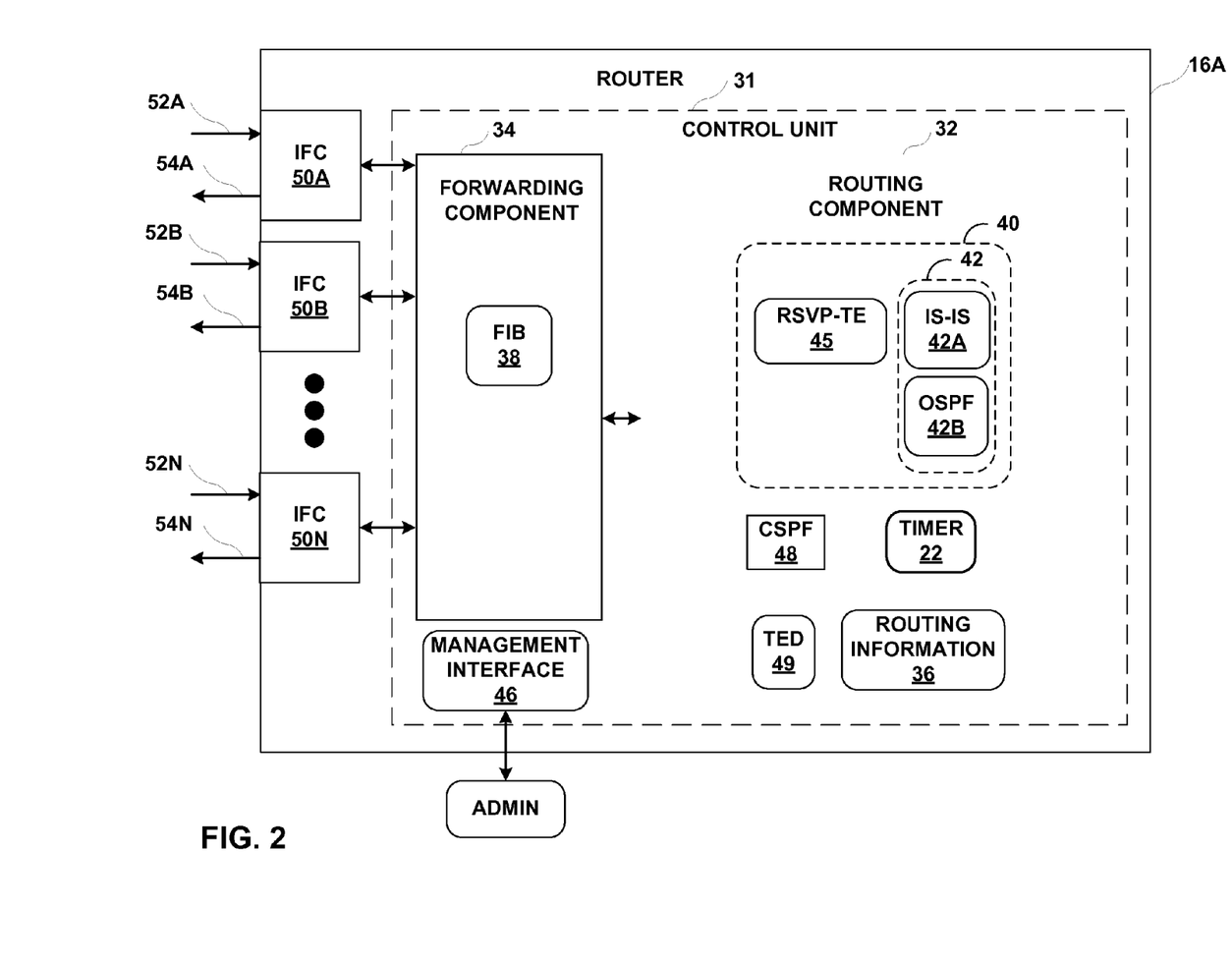
FIG. 2 is a block diagram illustrating an exemplary embodiment of the router of FIG. 1 in more detail.

FIG. 2 is a block diagram illustrating an exemplary embodiment of router 16A of FIG. 1 in more detail. In this example, router 16A includes a control unit 31 that comprises a routing component 32 and a forwarding component 34. In addition, router 16A includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. Routing component 32 may also be referred to as "control plane 32" in that routing component 32 provides an operating environment in which control plane protocols 40 and other control plane operations may be performed. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which router 16A is connected. In particular, IGPs 42 update routing information 36 to accurately reflect the topology of the network and other entities. Router 16A may include other example routing protocols such as Border Gateway Protocol (BGP) to provide one example.

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of PLR router 30 can be found in U.S. Pat. No. 8,339,939, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, IS-IS 42A or OSPF 42B may generate and maintain a traffic engineering database 49, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers. As another example, constrained Label Distribution Protocol (CR-LDP) 44 may send and receive label mapping messages for establishing a LSP.

To illustrate, routing component 40 may initiate CSPF process 48, which may compute a path through routers 16A-16B-16C-16D based on traffic engineering database 49 and router information 36, where this path is provided to RSVP-TE 45. RSVP-TE 45 may signal this path so as LSP 20 using label mapping messages. After configuring this path, RSVP-TE 45 may install this path in FIB 38. IFCs 50 may receive packets (which may generally be referred to as "network traffic"), which forwarding component 34 may process in accordance with FIB 38. When processing these packets, forwarding component 34 may perform a process referred to as call admission control (CAC) to identify whether to admit each of the packets to LSP 20. Upon admitting one or more of the packets to LSP 20, forwarding component 34 may append a label stack to the admitted one or more packets, the label stack including one or more labels associated with LSP 20. These packets that include an appended label stack may be referred to as MPLS packets. Forwarding component 34 may then transmit these MPLS packets via LSP 20 (which may be associated with one or more of IFCs 50 coupled to link 18A).

As described above, RSVP-TE 45 may first receive via one of IFCs 50 a PathErr message 24 from router 16B indicating a path error in LSP 20 at link 18D between routers 16B and router 16C. This Path Err message 24 may indicate that an error at link 18D that can be caused by a failure of link 18D or a failure of router 16C. Accordingly, routing component 40 may initiate timer 22 so as to provide time to resolve the source of the error as being one of the failure of link 18D or the failure of router 16C. The time for which timer 22 is configured to run may be determined as a function of a keep-alive timer configured for identifying a link status during operation of one of IGPs 42. In some examples, an administrator ("admin") or other operator, device or management entity may interface with router 16A via management interface 46 to configure timer 22 with the time, specifying in some examples a multiple of the keep-alive timer configured for identifying the link status during operation of one of IGPs 42. In some examples, the admin may configure timer 22 via the management interface 46 to specify a set duration or a conditional duration depending on how the error was first identified (e.g., via the PathErr message 24 or via LSA messages 26).

In any event, routing component 40 may resolve the source or, in other words, cause of the error through additional LSA messages 26 sent in accordance with one of IGPs 42. More specifically, routing component 40 may monitor routing information 36 to identify changes to the topography of network 14 as a result of receiving LSAs 26. When LSA 26B is received from router 16C indicating a failure of link 18D between router 16B and router 16C (where router 16C is adjacent to router 16B along LSP 20), IGPs 42 may update routing information 36 to reflect that link 18D has failed. In this respect, routing component 40 may determine, through analysis of routing information 36 that link 18D has failed via receipt of LSAs 26 given that router 18C (which was potentially the source of the error) has sent LSA 26B indicating a failure of link 18D and is therefore operational and not the source of the error. Routing component 40 may trigger this analysis of routing information 36 as any changes to routing information 32 may trigger this analysis of routing information 36. Upon determining that the cause of the error is link 18D and not router 18C, routing component 40 may cancel timer 22 and initiate CSFP 48 to identify a new path for a replacement LSP, where this replacement LSP does not utilize failed link 18D but may utilize router 18C. A potential replacement LSP 20 in this scenario may be shown as replacement link 20'.

Routing component 40, and specifically, IS-IS 42A or OSPF 42B, may, however, not receive any LSAs 26 from router 16C. Routing component 40 may however resolve this error by determining that the error is caused by a failure of router 16C. Routing component 40 may resolve the cause of the error again based on LSAs 26. More particularly, routing component 40 may determine that the source of the error is the failure of router 18C based on LSAs 26 received from each router adjacent to failed router 18C (i.e., routers 16B, 16D and 16E in the example of FIG. 2). Each of LSAs 26 may indicate a link error between a respective one of adjacent routers 16B, 16D and 16E and failed router 16C. Again, IGPs 42 may update routing information 36 in response to each of the LSAs 26 until all of links 18D, 18E and 18J to which each of adjacent routers 16B, 16D and 16E couple to router 16C have been removed. Upon determining that all of links 18D, 18E and 18J have been removed from the topology, IGPs 42 may remove router 16C, thereby effectively indicating that router 16C has failed. Routing component 40 may be informed of these changes to routing information 36 and, upon determining that router 16C has failed, cancel timer 22 and initiate CSPF 48 to determine a new path for a replacement LSP, such as LSP 21.

Although described as initiating timer 22 in response to receiving PathErr message 24, routing component 40 may initiate timer 22 in response to receiving one of LSAs 26 indicating a failure of link 18D between router 16B and 16C. Moreover, in those instances noted above where the source of the error cannot be determined or otherwise resolved, routing component 40 may execute CSPF 48 upon expiration of timer 22. In other words, routing component 40 may, upon expiration of the timer, execute CSPF 48 to configure replacement LSP 20' or 21 without having determined the cause of the error.

Figure 3:
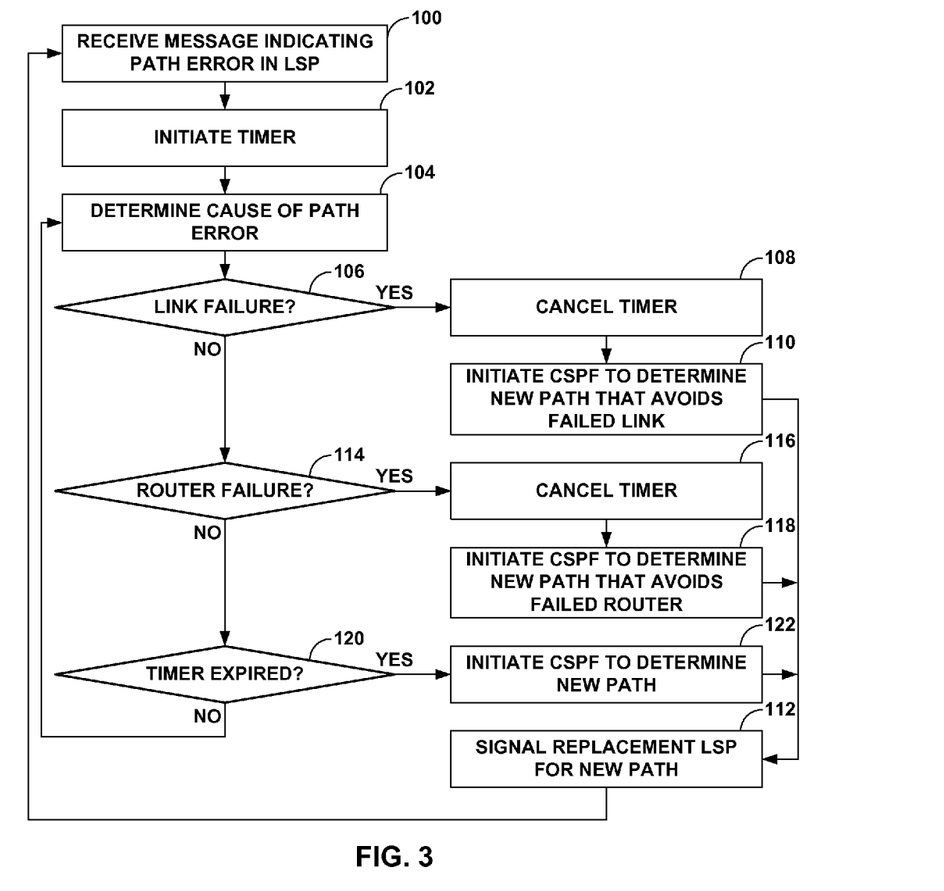
FIG. 3 is a flowchart illustrating example operation of a network device, such as the router of FIG. 2, in accordance with the techniques of this disclosure.

FIG. 3 is a flowchart illustrating example operation of a network device, such as router 16A, in accordance with the techniques of this disclosure. As described above with respect to router 16A as shown in the example of FIG. 2, RSVP-TE 45 may receive via a PathErr message 24 from router 16B indicating a path error in LSP 20 at link 18D between routers 16B and router 16C (100). RSVP-TE 45 may request routing component 40 to initiate timer 22 so as to provide time to resolve the source of the error as being one of the failure of link 18D or the failure of router 16C (102). Routing component 40 may resolve the source or, in other words, determine the cause of the error through additional LSA messages 26 sent in accordance with one of IGPs 42 (104). More specifically, routing component 40 may monitor routing information 36 to identify changes to the topography of network 14 as a result of receiving LSAs 26.

When LSA 26B originated by router 16C is received from router 16E indicating a failure of link 18D between router 16B and router 16C (where router 16C is adjacent to router 16B along LSP 20), IGPs 42 affirmatively determines that router 16C is operational and, therefore, link 18D must have failed. As such, IGPs 42 updates routing information 36 to reflect that link 18D has failed. In this respect, routing component 40 may determine, through analysis of routing information 36 that link 18D has failed via receipt of LSAs 26 given that router 18C (which was potentially the source of the error) has sent LSA 26B indicating a failure of link 18D and is therefore operational and not the source of the error (106). Upon determining that the cause of the error is link 18D and not router 18C ("YES" 106), routing component 40 may cancel timer 22 and initiate CSFP 48 to identify a new path for a replacement LSP that avoids failed link 18D (108, 110), and then initiate RSVP-TE 45 to signal replacement LSP 20' via the newly identified path (112).

IGP 42 may, however, not immediately receive any LSAs 26 from router 16C and thereby not affirmatively determine that the cause of the path error is a link failure ("NO" 106) at least during this polling period. Routing component 40 may however be able to resolve this error by determining that the error is caused by a failure of router 16C. Routing component 40 may resolve the cause of the error again based on LSAs 26. More particularly, routing component 40 may determine that the source of the error is the failure of router 18C based on LSAs 26 received from each router adjacent to failed router 18C (i.e., at least routers 16B and 16E in the example of FIG. 2) in the manner described above ("YES" 114"). Give that multiple LSAs 26 indicate failure of links to router 16C, routing component 40 determines that the cause of the original PathErr message 24 was likely due to failure of router 16C and not link Upon determining that router 16C has failed, routing component 40 cancels timer 22 and initiates CSPF 48 to determine a new path for a replacement LSP that avoids failed router 18C (116, 118), and then initiate RSVP-TE 45 to signal LSP 20' via the newly identified path (112).

Moreover, in those instances noted above where the source of the error cannot be determined or otherwise resolved ("NO" 106, "NO" 114) and timer 22 has not yet expired ("NO" 120), routing component 40 may continue to attempt to resolve the cause of the path error as described above (104-120). However, in those instances noted above where the source of the error cannot be determined or otherwise resolved ("NO" 106, "NO" 114) and timer 22 has expired ("YES" 120), routing component 40 may execute CSPF 48 upon expiration of timer 22 (122). In other words, routing component 40 may, upon expiration of the timer, execute CSPF 48 to configure replacement LSP 20' or 21 without having determined the cause of the error. Routing component 40 may then interface with RSVP-TE 45 to signal replacement LSP 20' via the newly identified path (112). Router 18A may continue to operate in this manner responding to path error messages with respect to the replacement LSP in the manner described above (100-122).

Figure 4:
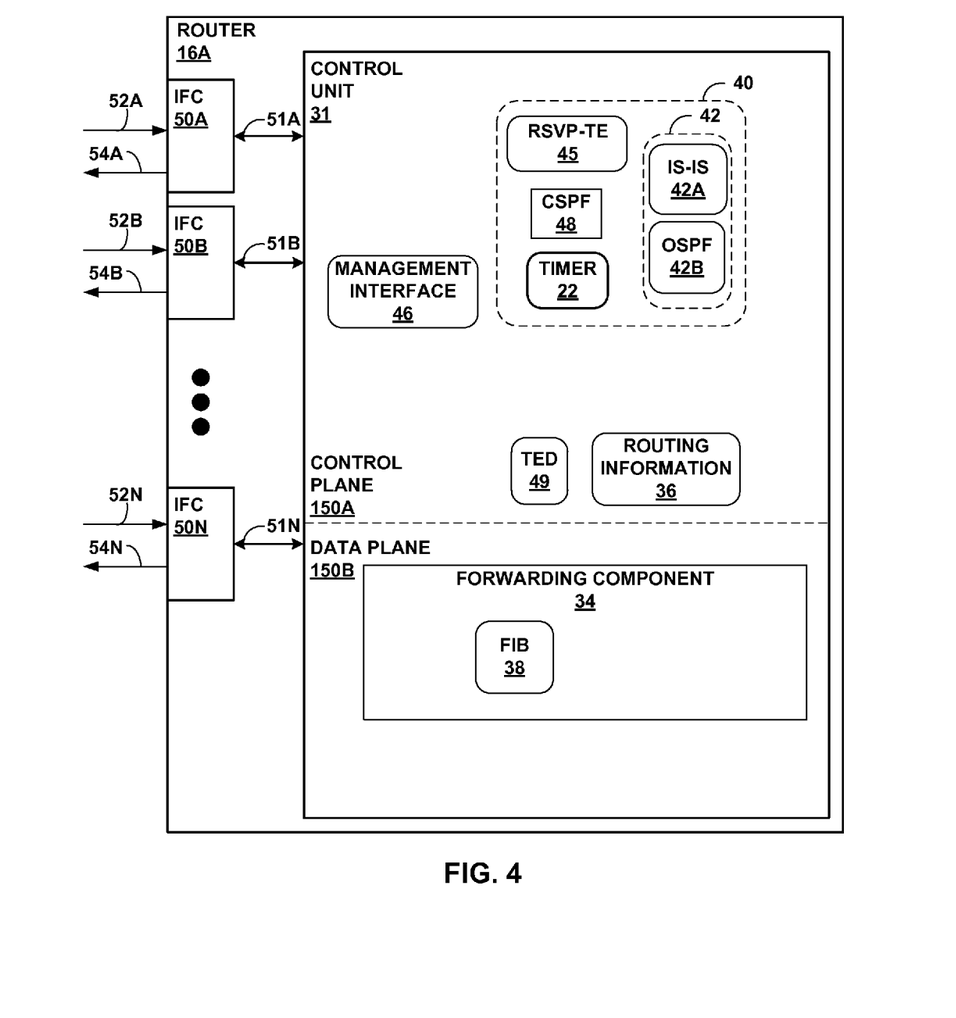
FIG. 4 is a block diagram illustrating another example of a network device configured to operate in accordance with techniques described in this disclosure.

FIG. 4 is a block diagram illustrating another example of a network device 16A configured to operate in accordance with techniques described in this disclosure. Router 16A includes a control unit 31 and interface cards 50A-50N ("IFCs 50") coupled to control unit 30 via internal links 51A-51N. Control unit 31 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 31 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 31 is divided into two logical or physical "planes" to include a first control or routing plane 150A ("control plane 150A") and a second data or forwarding plane 150B ("data plane 150B"). That is, control unit 31 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 150A of control unit 31 executes the routing functionality of router 16A, including routing protocol modules 40 and management interface 46 along with providing access to TED 49 and routing information 36. In this respect, control plane 150A represents hardware or a combination of hardware and software of control unit 31 that implements routing protocols by which routing information stored in routing information 36 (which may also be referred to as a "routing information base 36" or "RIB 36") may be determined. RIB 36 may include information defining a topology of a network, such as network 14 of FIG. 1. Control plane 150A may resolve the topology defined by routing information in RIB 36 to select or determine one or more routes through the network. Control plane 150A may then update data plane 150B with these routes, where data plane 150B maintains these routes as forwarding information base 38 ("FIB 38"). Forwarding or data plane 150B represents hardware or a combination of hardware and software of control unit 31 that forwards network traffic in accordance with FIB 38.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   receiving, with an ingress network device that acts as an ingress for a label switched path (LSP) traversing at least a portion of a network, a message indicating an error along the LSP;
   delaying an operation, with the ingress network device, performed to configure a replacement LSP to be used in place of the LSP in order to provide time during which a cause of the error along the LSP is able to be determined;
   determining that the cause of the error is a failure of a network device supporting operation of the LSP based on link state advertisements (LSAs) received from multiple network devices adjacent to the failed network device in accordance with an interior gateway protocol (IGP), each of the LSAs indicating a link error between a respective one of the network devices adjacent to the failed network device and the failed network device; and
   when the cause of the error is determined to be the failure of the network device supporting operation of the LSP, performing the operation to configure the replacement LSP with the ingress network device such that the replacement LSP avoids the failed network device.

2. The method of claim 1, wherein delaying the operation comprises delaying a path computation operation that computes a new path traversing at least a different portion of the network for which the replacement LSP is to be configured, the path computation operation performed in a control plane of the ingress network device.

3. The method of claim 2, wherein delaying the path computation operation comprises delaying a constrained shortest path first (CSPF) path computation operation that computes the new path according to a CSFP algorithm.

4. The method of claim 1, further comprising initiating a timer upon receipt of the message indicating the error, the timer configured to run for the time during which the cause of the error along the LSP is able to be determined,
   wherein delaying the operation comprises delaying the operation until expiration of the timer.

5. The method of claim 4, wherein the time for which the timer is configured to run is determined as a function of a keep-alive timer configured for identifying a link status during operation of the IGP.

6. The method of claim 4, further comprising:
   determining that the cause of the error is a link error;
   cancelling the timer before expiration of the time upon determining that the cause of the error is the link error; and
   in response to determining the cause of the error is a link error, configuring the replacement LSP with the ingress network device so as to avoid a link along the LSP that is the cause of the link error.

7. The method of claim 4, further comprising receiving one of the LSAs from a network device along the LSP that is adjacent to a network device that sent the message and downstream from the network device along the LSP,
   wherein determining that the cause of the error is the link error comprises determining that the cause of the error is the link error based on the LSA.

8. The method of claim 4, further comprising cancelling the timer before expiration of the time upon determining that the cause of the error is the failure of the network device.

9. The method of claim 4, further comprising upon expiration of the timer, performing the operation to configure the replacement LSP without having determined the cause of the error.

10. An ingress network device configured to act as an ingress for a label switched path (LSP) traversing at least a portion of a network, the ingress network device comprising:

at least one interface configured to receive a message indicating an error along the LSP; and one or more processors configured to:
  delay an operation performed to configure a replacement LSP to be used in place of the LSP in order to provide time during which a cause of the error along the LSP is able to be determined;
  determine that the cause of the error is a failure of a network device supporting operation of the LSP based on link state advertisements (LSAs) received from multiple network devices adjacent to the failed network device in accordance with an interior gateway protocol (IGP), each of the LSAs indicating a link error between a respective one of the network devices adjacent to the failed network device and the failed network device; and
  when the cause of the error is determined to be the failure of the network device supporting operation of the LSP, performing the operation to configure the replacement LSP with the ingress network device such that the replacement LSP avoids the failed network device.

11. The ingress network device of claim 10, wherein the one or more processors are, when configured to delay the operation, configured to delay a path computation operation that computes a new path traversing at least a different portion of the network for which the replacement LSP is to be configured, the path computation operation performed in a control plane of the ingress network device.

12. The ingress network device of claim 11, wherein the one or more processors are, when configured to delay the operation, configured to delay a constrained shortest path first (CSPF) path computation operation that computes the new path according to a CSFP algorithm.

13. The ingress network device of claim 10,
  wherein the one or more processors are further configured to initiate a timer upon receipt of the message indicating the error, the timer configured to run for the time during which the cause of the error along the LSP is able to be determined, and
  wherein the one or more processors are, when configured to delay the operation, configured to delay the operation until expiration of the timer.

14. The ingress network device of claim 13, wherein the time for which the timer is configured to run is determined as a function of a keep-alive timer configured for identifying a link status during operation of the IGP.

15. The ingress network device of claim 13, wherein the one or more processors are further configured to determine that the cause of the error is a link error, cancel the timer before expiration of the time upon determining that the cause of the error is a link error, and in response to determining the cause of the error is a link error, configuring the replacement LSP with the ingress network device so as to avoid a link along the LSP that is the cause of the link error.

16. The ingress network device of claim 13,
  wherein the at least one interface is further configured to receive one of the LSAs from a network device along the LSP that is adjacent to a network device that sent the message and downstream from the network device along the LSP;
  wherein the one or more processors are, when configured to determine that the cause of the error is the link error, configured to determine that the cause of the error is the link error based on the LSA.

17. The ingress network device of claim 13, wherein the one or more processors are further configured to cancel the timer before expiration of the time upon determining that the cause of the error is the failure of the network device.

18. The ingress network device of claim 13, wherein the one or more processors are further configured to, upon expiration of the timer, perform the operation to configure the replacement LSP without having determined the cause of the error.

19. The ingress network device of claim 13, wherein the ingress network device comprises a router.

20. A non-transitory computer-readable storage medium having stored thereon instructions that, when executed, cause one or more processors of an ingress network device to:
  receive, with the ingress network device acting as an ingress for a label switched path (LSP) traversing at least a portion of a network, a message indicating an error along the LSP;
  delay an operation performed to configure a replacement LSP to be used in place of the LSP in order to provide time during which a cause of the error along the LSP is able to be determined; and
  determine that the cause of the error is a failure of a network device supporting operation of the LSP based on link state advertisements (LSAs) received from multiple network devices adjacent to the failed network device in accordance with an interior gateway protocol (IGP), each of the LSAs indicating a link error between a respective one of the network devices adjacent to the failed network device and the failed network device; and
  when the cause of the error is determined to be the failure of the network device supporting operation of the LSP, perform the operation to configure the replacement LSP with the ingress network device such that the replacement LSP avoids the failed network device.

* * * * *